United States Patent
Grundman et al.

(10) Patent No.: US 8,909,591 B1
(45) Date of Patent: Dec. 9, 2014

(54) DETECTION OF SPAM USING CONTEXTUAL ANALYSIS OF DATA SOURCES

(71) Applicant: Google Inc., Mountain View, CA (US)

(72) Inventors: Douglas Richard Grundman, Rosemont, PA (US); Baris Yuksel, New York, NY (US); Anurag Adarsh, Bangalore (IN); Piyush Janawadkar, Bangalore (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/254,335

(22) Filed: Apr. 16, 2014

Related U.S. Application Data

(62) Division of application No. 13/190,634, filed on Jul. 26, 2011, now Pat. No. 8,738,557.

(51) Int. Cl.
*G06N 7/00* (2006.01)
*H04L 29/06* (2006.01)

(52) U.S. Cl.
CPC ................................. *H04L 63/20* (2013.01)
USPC .......................................................... 706/52

(58) Field of Classification Search
None
See application file for complete search history.

(56) References Cited

U.S. PATENT DOCUMENTS

| | | | |
|---|---|---|---|
| 8,332,415 B1 | 12/2012 | Adarsh et al. | |
| 8,462,991 B1 * | 6/2013 | Clements | 382/112 |
| 8,473,491 B1 | 6/2013 | Yuksel et al. | |
| 2008/0015928 A1 * | 1/2008 | Chandra | 705/10 |
| 2008/0228998 A1 | 9/2008 | Colecchia et al. | |
| 2009/0063371 A1 | 3/2009 | Lin | |
| 2009/0276208 A1 | 11/2009 | Pagan | |
| 2009/0300129 A1 | 12/2009 | Golub | |
| 2011/0029467 A1 | 2/2011 | Spehr et al. | |
| 2011/0071965 A1 | 3/2011 | Long et al. | |

* cited by examiner

*Primary Examiner* — Alan Chen
*Assistant Examiner* — Mikayla Chubb
(74) *Attorney, Agent, or Firm* — Lerner, David, Littenberg, Krumholz & Mentlik, LLP

(57) ABSTRACT

Aspects of the disclosure provide for detection of spam business listings. Aspects operate to identify business listing characteristics in trusted sources and untrusted sources. As untrusted sources are likely to contain more spam, characteristics that are present in untrusted sources but not present in trusted sources are typically indicative of spam listings, and vice versa. Thus, statistical analysis of the frequency of characteristics within each source may be used to identify common characteristics of spam listings. These characteristics may further be analyzed in specific listing contexts, as different listing contexts (e.g., different types of businesses) typically use different terms and vocabularies, such that terms that are indicative of spam in one context may not be indicative of spam in another. Various methods for leveraging this context-specific statistical information to improve spam detection operations are disclosed.

20 Claims, 7 Drawing Sheets

DETECTION OF SPAM USING CONTEXTUAL ANALYSIS OF DATA SOURCES

CROSS-REFERENCE TO RELATED APPLICATIONS

The present application is a divisional of U.S. patent application Ser. No. 13/190,634, filed Jul. 26, 2011, the disclosure of which is incorporated herein by reference.

BACKGROUND

This specification relates to evaluating sources that collect information, for example, to determine if the information includes spam.

Search engines can be configured to receive search queries provided by users and to provide search results that satisfy the search queries. A search engine can communicate with multiple client devices, for example, computers, through one or more networks, such as the Internet. In some situations, the search engine can search from an index of resources when it receives a search query. The index can be created by crawling multiple resources, each of which is stored, for example, in one or more computer systems. In addition to identifying the resources, the search engine can additionally rank the resources included in the search results according to a relevance of each search result to the search query.

The resources can include information describing business entities that offer services, products, or both. In some situations, a business entity can have a dedicated resource, for example, a website addressed by a unique uniform resource locator (URL), which the search engine can crawl and index. As an alternative or in addition, a business entity can provide its business information to one or more of several sources that collect information about such entities, for example, the Yellow Pages. A source can store the information (including information describing business entities) in a computer system. A search engine can crawl and index the stored information. Alternatively, or in addition, the source can provide the stored information to the search engine. When the search engine receives a search query that references a product, service (or both), the search engine can identify, from the index, relevant business information collected and stored by the source.

BRIEF SUMMARY

A method and system as described identifies business listing characteristics. Aspects of the disclosure provide a computer implemented method for identifying business listings. The method includes determining, using a processor, a first frequency value of a business listing characteristic within a first plurality of business listings received from a first source, the first plurality of business listings being associated with a particular business listing context, determining, using the processor, a second frequency value of the business listing characteristic within a second plurality of business listings received from a second source, the second plurality of business listings being associated with the particular business listing context, determining a frequency differential between the first frequency value and the second frequency value, in response to the frequency differential exceeding a threshold differential, identifying the business listing characteristic as a differential characteristic, and identifying a particular business listing of the plurality of business listings as a spam listing using the differential characteristic. The business listing context may be a type of business. The threshold differential may be a standard deviation value. The business listing characteristic may be at least one of a title length, a text term, a phone number, and an address. The act of identifying the particular business listing may include identifying a spam score for the particular business listing using the differential characteristic. The act of identifying the past business listing as the spam listing may be done in response to the spam score being greater than a threshold. The act of identifying the particular business listing may include mapping the spam score to a context-specific curve associated with the business listing context to determine a probability that the particular business listing is spam. Identifying the past business listing as the spam listing may be done in response to the probability being greater than a probability threshold. The probability threshold may be a context-specific probability threshold associated with the business listing context. The first source may be a trusted source and the second source may be an untrusted data source.

Aspects of the disclosure also provide a computer-implemented method for calibrating a probability of spam. The method includes determining, using a processor, a spam score for each of a plurality of business listings, dividing each of the plurality of business listings into a plurality of buckets based on the spam score for each listing, determining an average score for a set of business listings in each bucket, determining a ratio of spam listings to legitimate listings for the set of business listings in each bucket, determining a closed-form function that maps the average score for each bucket to the ratio for each bucket, such that a first axis of the closed-form function is the average score and a second axis of the closed-form function is the ratio, and determining a probability that a business listing is a spam listing by mapping a spam score for the business listing to the closed-form function. The closed-form function may be chosen from among a curve family $$\sigma_{a,b}(x) = \frac{1}{1 + e^{-a(x-b)}}.$$

In some aspects, the closed-form function is determined by inputting the average and the ratio for each bucket into a function according to equation:

$$f(a, b) = \sum_{(x,y)} (\sigma_{a,b}(x) - y)^2,$$

and determining, using the processor, the values of a and b that give a minimal value of $f(a,b)$. Each of the plurality of business listings may be chosen from a particular business listing context. The particular business listing context may be a type of business.

Aspects of the disclosure also provide a computer-implemented method for determining a spam identification cutoff threshold. The method includes determining, using a processor, a spam score for each of a plurality of business listings, ranking the plurality of business listings by spam score, identifying a plurality of possible cutoff thresholds, the possible cutoff thresholds at the midpoint between spam scores of adjacently ranked business listings, evaluating a precision value and a recall value, using the processor, for each of the possible cutoff thresholds, and determining a spam identification cutoff threshold based on the precision values and the recall values. The spam identification cutoff may be determined by choosing the possible cutoff threshold where a function F is maximized, the function F being determined according to the equation:

$$F(\text{cutoff}) = \frac{\text{precision} \times \text{recall}}{\text{precision} + \text{recall}}.$$

Each of the plurality of business listings may be chosen from among a particular business listing context. The particular business listing context may be a type of business.

Aspects of the disclosure also provide a processing system for identifying business listings. The processing system includes at least one processor, and a memory, coupled to the processor, for storing business listings. The processor is configured to determine a first frequency value of a business listing characteristic within a first plurality of business listings received from a first source, the first plurality of business listings being associated with a particular business listing context, determine a second frequency value of the business listing characteristic within a second plurality of business listings received from a second source, the second plurality of business listings being associated with the particular business listing context, determine a frequency differential between the first frequency value and the second frequency value, in response to the frequency differential exceeding a threshold differential, identify the business listing characteristic as a differential characteristic, and identify a particular business listing of the plurality of business listings as a spam listing using the differential characteristic. The business listing context may be a type of business. The threshold differential may be a standard deviation value. The business listing characteristic may be at least one of a title length, a text term, a phone number, and an address. The processor may be further configured to identify a spam score for the particular business listing using the differential characteristic, and identify the particular business listing as the spam listing in response to the spam score being greater than a threshold. The processor may be further configured to map the spam score to a context-specific curve associated with the business listing context to determine a probability that the particular business listing is spam, and to identify the business listing as a spam listing in response to the probability being greater than a probability threshold. The probability threshold may be a context-specific probability threshold associated with the business listing context. The first source may be a trusted source and the second source may be an untrusted data source.

DETAILED DESCRIPTION

Aspects of the disclosure describe a system and method for identifying business listings as spam listings. The term "spam listing" in the present context generally refers to a business listing that attempts to manipulate a system to falsely drive traffic to particular websites and/or phone numbers. For example, a taxi service may indicate that they are located at a particular busy intersection, when in fact they are located across town. Manipulating their business listing in this manner may cause the taxi service to be identified as the nearest service for a user searching for a taxi at the busy intersection. If a user were to call this taxi service, they would be forced to wait while their taxi comes from across town.

The system and method extract business listings that are provided by various data sources. Each data source may be associated with a level of "trust." In the context of the present application, the term "trust" is generally defined as the likelihood that a listing provided by the data source is a spam listing. For example, a data source that is easily spammed is typically associated with a lower level of trust than a data source that is not easily spammed. An example of a data source that is easily spammed might be a web form that allows a user to submit a business listing with no verification or oversight. An example of a data source that is not easily spammed might be a business listing extracted from the telephone book yellow pages.

Aspects of the disclosure identify various business contexts among the listings provided by the data sources. The term "context" refers to a set of business listings that typically contain similar sorts of keywords, such as a particular market (e.g., a set of businesses that share a common type of goods or services). For example, a given context may be defined based upon the type of business (e.g., florists, hotels, record stores, plumbers, attorneys, restaurants). Characteristics of businesses in the particular context are extracted for each data source, and the frequency of each particular characteristic is determined for the particular data source. Characteristic frequencies for data sources of different trust levels are then compared to identify characteristics that are identified more frequently in data sources of a first trust level and less frequently in data sources of a second trust level. For example, a term that appears frequently in an untrusted data source but infrequently in a trusted data source may be indicative of a spam listing, since the untrusted data source typically contains a higher number of spam listings.

Figure 1:
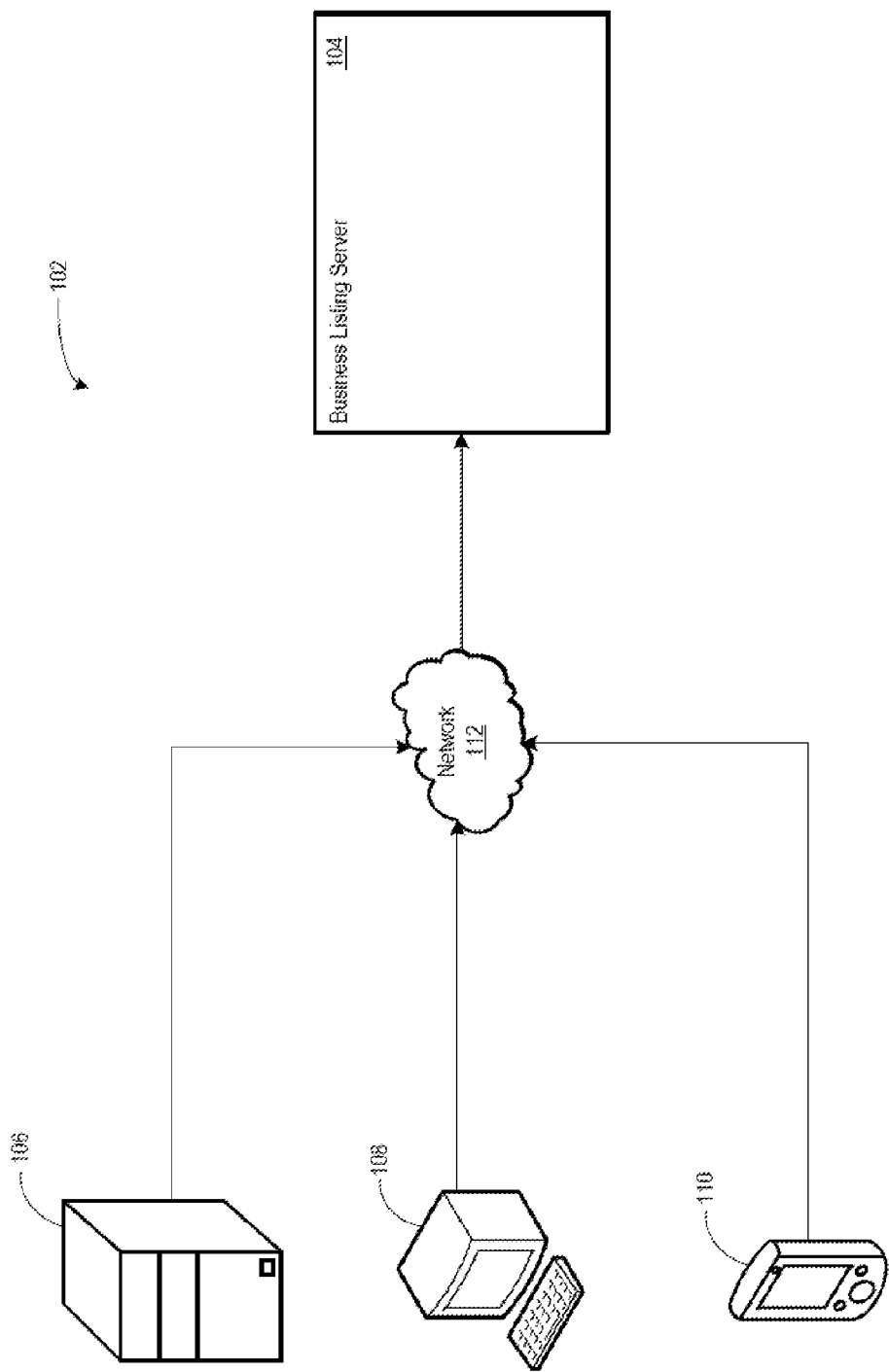
FIG. 1 is a pictorial diagram depicting an example of a system for providing business listings in accordance with aspects of the disclosure.

FIG. 1 illustrates one example of a system 102 for identifying business listings. The system 102 may include a business listing server 104 in communication with client devices 106-110 via a network 112. The business listing server 104 maintains listings which are associated with businesses. A business listing may include many different types of information about the business, such as the business' title (e.g., corporate business name ("FakeCorp, Inc."), informal business name ("FakeCorp"), etc.), the business's street address, the business's phone number, a URL for the business, a description of the business, hours of operation, or any other type of information about the business.

The client devices 106-110 may comprise many different types of client devices, and the business listing server 104 may provide business listings of a type and in a manner relevant to the type of client device. For example, an Internet search provider 106 operative to provide one or more search results may include a business listing provided by the business listing server 104. Where the client device 106 is an Internet search provider, the business listing server 104 may provide one or more business listings to the Internet search provider 106 in response to requests for those business listings. For example, the Internet search provider 106 may receive a search query from a user, and the Internet search provider 106 may communicate with the business listing server 104 to include one or more business listings in the search results that the Internet search provider 106 may provide to the user.

The client device 106 may also be a social network provider or a local search provider that communicates with the business listing server 104 to provide one or more business listings in response to queries that the client device 106 may receive from one or more users.

The client device 106 may alternatively be a map service provider or navigation assistance provider, where the information for one or more points of interest presented on a map provided by the client device 106 is based on one or more business listings provided by the business listing server 104. In other words, the client device 106 may be any system or other provider that communicates with the business listing server 104 to retrieve and/or request one or more business listings.

The business listing server 104 may also comprise an Internet search provider that provides one or more business listings to one or more end users, such as users using client devices 106-110. Moreover, the business listing server 104 may comprise any one or more of the aforementioned systems for providing business information to one or more end users, such as a map service provider, a local search provider, a social network provider, or any other type of Internet service.

The client devices 106-110 may include a desktop computer 108 in use by a user to conduct Internet searches using the business listing server 104. The desktop computer 108 may transmit one or more search queries to the business listing server 104 and, in response, the business listing server 104 may include one or more business listings in the search results sent to the desktop computer 108. As discussed below, the business listing information provided to the desktop computer 108 may include one or more Uniform Resource Locations ("URLs") for one or more websites associated with the business listings provided to the desktop computer 108. The user may select one or more of the URLs to visit the websites associated with the business listings. A website URL for a business listing is one of many different types of business listing information that the business listing server 104 may provide, and additional types of business information are discussed further below.

The client device 110 may be a mobile device 110, such as a laptop, a smart phone, a Personal Digital Assistant ("PDA"), a tablet computer, netbook or other such mobile device. As with the desktop computer 108, the mobile device 110 may transmit one or more queries to the business listing server 104, such as search queries or navigation queries, and the business listing server 104 may incorporate one or more business listings in the response sent to the mobile device 110. Hence, whether the client devices 106-110 are systems 106 (e.g., Internet search providers, local search providers, social network providers, etc.), desktop computers 108, mobile devices 110 (e.g., laptops, smartphones, PDAs, etc.), the business listing server 104 may be operative to provide one or more business listings to the client devices 106-110 based on a request for the one or more business listings.

When a business listing is requested from the business listing server 104, the business listing server 104 may transmit a response that includes a complete business listing. The requesting party may parse the business listing to extract a subset of business information for the requesting party's use. For example, an Internet search provider may request a business listing from the business listing server 104 in response to an Internet search query by an end user. When the Internet search provider receives the business listing, the Internet search provider may then transmit the business' title and associated URL to the end user, rather than the complete set of business information that the Internet search provider initially received. Of course, the Internet search provider may provide the complete set of business information to the end user.

The business listing server 104 may be operative to transmit a select portion of the business listing to a requesting party. Using the Internet search provider example above, the business listing server 104 may receive a request for a business listing title and business listing URL, and based on this request, the business listing server 104 may transmit the business' title and associated URL to the Internet search provider. However, it should be understood that the examples above may also apply where the business listing server 104 communicates with the end user (e.g., client devices 108-110). Hence, the business listing server 104 is flexible and robust enough such that it may provide a complete business listing or a subset of the business listing, depending on the request that the business listing server 104 receives.

The network 112 may be implemented as any combination of networks. As examples, the network 112 may be a Wide Area Network ("WAN"), such as the Internet; a Local Area Network ("LAN"); a Personal Area Network ("PAN"), or a combination of WANs, LANs, and PANs. Moreover, the network 112 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol. Although only a few devices are depicted in FIG. 1, it should be appreciated that a typical system may include a large number of connected computers.

Communication between and within the business listing server 104 and the network 112 may be implemented using one or more interfaces, such as Web Services, or Enterprise Service Bus interfaces. Other examples of interfaces include message passing, such as publish/subscribe messaging, shared memory, and remote procedure calls.

The business listing server 104 may be at one node of a network 112 and be operative to directly and indirectly communicate with other nodes of the network. For example, the business listing server 104 may comprise a web server that is operative to communicate with the client devices 106-110 via the network 112 such that the business listing server 104 uses the network 112 to transmit and display information to a user via the client devices 106-110. The business listing server 104 may also comprise a plurality of computers that exchange information with different nodes of a network for the purpose of receiving, processing and transmitting data to the client devices. In this instance, the client devices 106-110 may be at different nodes of the network than any of the computers comprising the business listing server 104.

Figure 2:
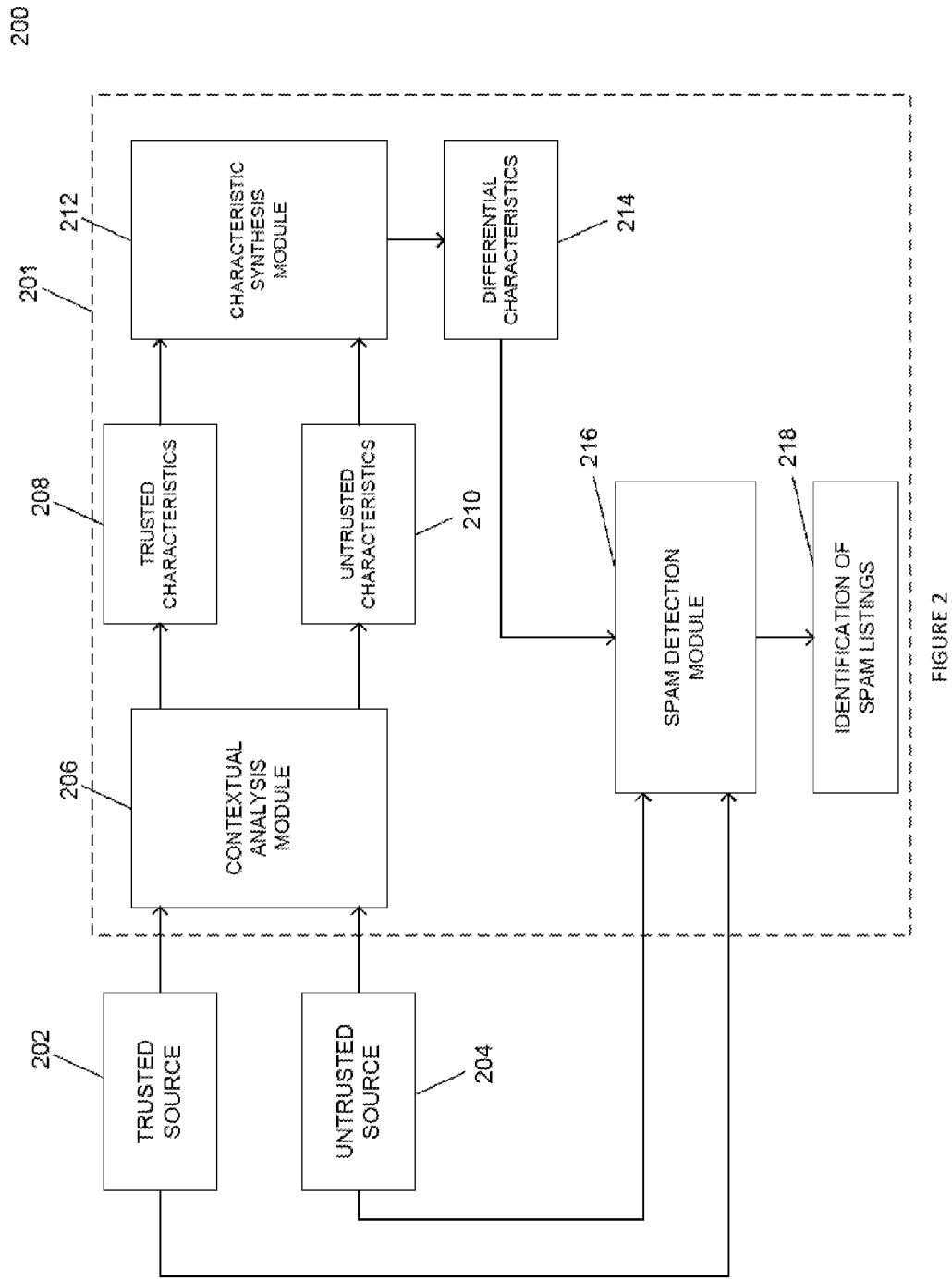
FIG. 2 is a block diagram depicting an example of a process flow for spam detection in accordance with aspects of the disclosure.

FIG. 2 is a block diagram depicting an example of a process flow 200 for spam detection in accordance with aspects of the disclosure. A trusted source 202 and an untrusted source 204 each provide information containing one or more business listings, such as to a business listing server 201. If the business listing server 201 trusts that information received from a source does not include spam, then the business listing server 201 may designate that source as a trusted source. The business listing server 201 can designate a source as a trusted source based on, for example, a reputation of the source or previous dealings with the source or combinations of them. Sources that the pre-computation business listing server 201 does not designate as trusted sources are untrusted sources. A trusted source and an untrusted source can be associated with respective identifiers. Whether the source is trusted or untrusted can be determined based on the identifiers. In addition, each source can be identified by a corresponding identifier. In some implementations, designations of a source as trusted or untrusted can be manually configured in the business listing server 201. Alternatively, or in addition, the business listing server 201 can be configured to determine if a source for instance trusted or untrusted based on a reputation of the source, i.e., through previous interactions between the business listing server 104 and the source.

In some situations, sources can collect information from business entities in electronic forms, for example, in XML format. An electronic form can include fields that correspond to the attributes into which values, for example, text items can be provided. For example, the text item that corresponds to a business entity can be "Company X" and the text item that corresponds to the entity's business category can be "Website Designers in Y," where "Y" is a name of a city. Using such electronic forms, for example, both the trusted source 202 and the untrusted source 204 can collect business information about multiple business entities, and transmit the collected information to the business listing server 201. The business listing server 201 can extract the information, for example, by parsing the electronic forms in which the information is received. Although the present example describes a single trusted source 202 and a single untrusted source 204, aspects of the invention may also utilize multiple sources of each variety. Other aspects of the invention may include additional levels of trust other than "trusted" and "untrusted" reflecting an overall likelihood of a particular listing supplied by the source as being spam.

A contextual analysis module 206 analyzes the business listings received via the trusted source 202 and the untrusted source 204. Contextual analysis refers to the process by which the business listing server 201 distributes business listings received from each source into a set of contexts, and determines the frequency of listing characteristics within those contexts. For example, each business listing may be associated with a type of business. This type may be specified at the time the business listing is created (e.g., by a user), or it may be dynamically determined during contextual analysis based on the business name, location, phone number, website, or other characteristic information. The type of business may be used to establish a context to examine characteristic frequency. For example, contextual analysis may be performed on all hotels, plumbers, or florists. Other contexts may be further limited, such as by geographical region (e.g., all hotels in New York City).

The contextual analysis module 206 determines the frequency of business listing characteristics of each business listing in the specified context. For example, listing characteristics may include the frequency with which a particular term appears in a listing title, the length of a listing title, a web page, a phone number, a proprietor, whether the title contains a dollar sign, or the like. Different contexts typically have different frequencies of particular characteristics, such that a characteristic that might indicate spam in one context does not in another context. For example, a title with many words may be less indicative of spam in one context (e.g., a law firm with many named partners) than in another context (e.g., a restaurant).

The contextual analysis module 206 identifies a set of trusted characteristics 208 and a set of untrusted characteristics 210. These characteristics identify the frequency of each characteristic within the contextual set of business listings received via the trusted source 202 and the untrusted source 204, respectively. The set of trusted characteristics 208 and the set of untrusted characteristics 210 are used by the characteristic synthesis module 212 to identify a set of differential characteristics 214.

The characteristic synthesis module 212 identifies discrepancies between the frequency values identified in the set of trusted characteristics 208 and the untrusted characteristics 210. For example, a particular term (e.g., "cheap") may appear more often in the set of untrusted characteristics 210 than in the set of trusted characteristics 208, or the average title length may be longer in the set of untrusted characteristics 210 than in the set of trusted characteristics 208. The characteristic synthesis module 212 identifies these discrepancies using statistical analysis methods. Particular characteristics that are present in the set of untrusted characteristics 210 but absent in the set of trusted characteristics 208 may be flagged as suspicious, or indicative of a spam business listing. Characteristics that are present in the set of trusted characteristics 208 but absent in the set of untrusted characteristics 210 may be flagged as trustworthy, or indicative of a legitimate business listing.

The set of characteristics that are frequently present within one set of characteristics but not the other are identified as a set of differential characteristics 214. The differential characteristics 214 may be used by a spam detection module 216 to identify other listings as spam listings or true listings. The trusted source 202 and the untrusted source 204 may continue to provide business listings for use in the system, and the spam detection module 216 identifies listings that contain characteristics identified within the set of differential characteristics 214. The spam detection module 216 may score listings based on the presence or absence of these characteristics, and identify a listing as spam based upon the score. Methods for identifying spam listings in this manner are described further below (see FIGS. 4-7).

Figure 3:
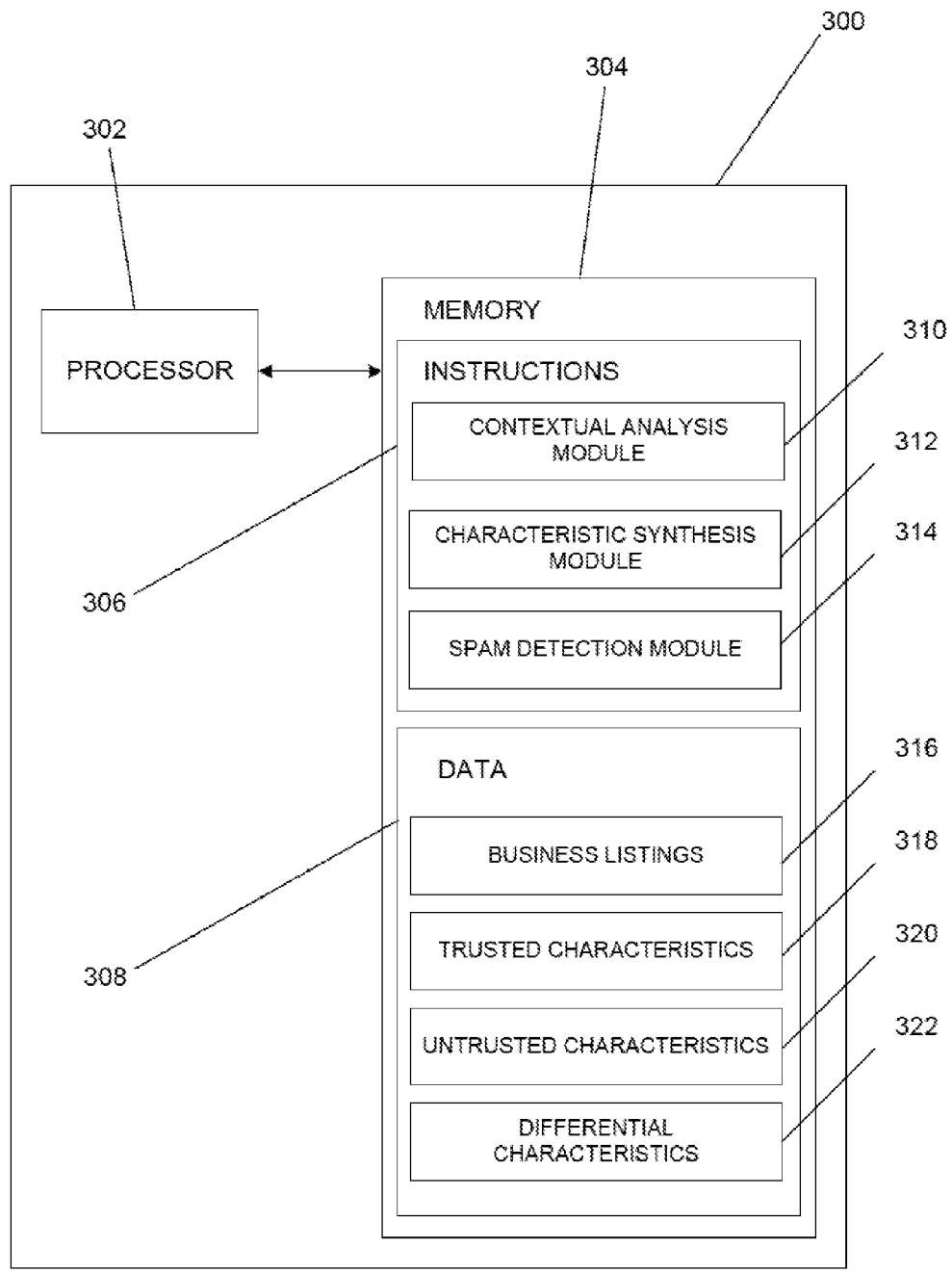
FIG. 3 is a block diagram depicting an example of a business listing server in accordance with aspects of the disclosure.

FIG. 3 is a block diagram depicting an example of a business listing server 300, such as the business listing server 104 or the business listing server 201. The business listing server 300 may include a memory 304 in communication with a processor 302. The memory 304 may store information that is accessible by the processor 302, including instructions 306 that may be executed by the processor 302, and data 308. The memory 304 may be of any type of memory operative to store information accessible by the processor 302, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 306 may be any set of instructions to be executed directly (such as machine code or bytecode) or indirectly (such as scripts) by the processor 302. For example, the instructions 306 may be stored as computer code on the computer-readable medium. In that regard, the terms "instructions" and "programs" may be used interchangeably herein. The instructions 306 may be stored in object code format for direct processing by the processor 302, or in any other computer language including scripts or collections of independent source code modules that are interpreted on demand or compiled in advance.

The instructions 306 may comprise a contextual analysis module 310. The contextual analysis module 310 analyzes the characteristics of business listings provided by various sources. As described above, the contextual analysis module 310 identifies the frequency with which particular characteristics manifest in business listings of a particular context as supplied by trusted and untrusted data sources, such as the business listings 316. The contextual analysis module 310 generates a set of trusted characteristics 318 which identify the frequency of particular characteristics for a particular context received from a trusted data source, and a set of untrusted characteristics 320 which identify the frequency of particular characteristics for the particular context received from an untrusted data source.

The instructions 306 may further comprise a characteristic synthesis module 312. As described above, the characteristic synthesis module 312 compares the frequency of particular characteristics identified within the set of trusted characteristics 318 and the set of untrusted characteristics 320. The characteristic synthesis module 312 identifies discrepancies in the frequency of characteristics between the set of trusted characteristics 318 and the set of untrusted characteristics 320 as differential characteristics 322. This set of differential characteristics 322 may include each characteristic for which a discrepancy is identified, whether the characteristic is associated with legitimate listings or spam listings, and a correlation value (e.g, how strongly the particular characteristic correlates to either spam listings or legitimate listings).

The instructions 306 may further comprise a spam detection module 314. The spam detection module 314 utilizes the differential characteristics 322 to identify listings as spam listings or legitimate listings based on the characteristics of those listings.

Although the example described herein describes the contextual analysis module 310, the characteristic synthesis module 312, and the spam detection module 314 as distinct modules, aspects of the disclosure may also provide similar functionality in a single module, or multiple modules. For example, the contextual analysis module 310 may be integrated with the characteristic synthesis module 312 to generate the set of differential characteristics 322 directly from listings provided by the data sources, or the modules may be integrated into a listing hosting module for providing business listings in response to search queries. Aspects of the instructions 306 may be implemented as software executing on the processor 302 or by various hardware interfaces, such as ASICs, field-programmable gate arrays ("FPGAs"), etc.

The data 308 may be retrieved, stored or modified by the processor 302 in accordance with the instructions 306. For instance, although the architecture is not limited by any particular data structure, the data may be stored in computer registers, in a relational database as a table having a plurality of different fields and listings, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Portions of the data 308 may comprise one or more business listings 316, the set of trusted characteristics 318, the set of untrusted characteristics 320, and the set of differential characteristics 322, as described above. The business listings 316 comprise a set of business listings as described above. These business listings 316 represent data describing one or more businesses. The business listings 316 may store information about the business, such as the business's title, the business's phone number, the description about the business, the business's postal address, the URL for the business' website, the business's hours of operation, or other such business information. The business listings may be indexed by a geographic location. For example, the business listings 316 may be searchable by the location of a user to identify businesses in proximity to the user.

Although FIG. 3 functionally illustrates the processor 302 and memory 304 as being within the same block, the processor 302 and memory 304 may actually comprise multiple processors and memories that may or may not be stored within the same physical housing. Accordingly, references to a processor, computer or memory will be understood to include references to a collection of processors, computers or memories that may or may not operate in parallel.

In addition, the business listing server 300 may be implemented with additional, different, or fewer components. As one example, the processor 302 and any other logic or component may be implemented with a microprocessor, a microcontroller, a DSP, an application specific integrated circuit (ASIC), discrete analog or digital circuitry, or a combination of other types of circuits or logic.

Logic, such as the instructions 306, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Although certain advantages are obtained when information is transmitted or received as noted above in FIGS. 1-3, other aspects of the system and method are not limited to any particular manner of transmission of information. For example, in some aspects, information may be sent via a tangible medium such as an optical disk or portable drive. In other aspects, the information may be transmitted in a non-electronic format and manually entered into the system.

Figure 4:
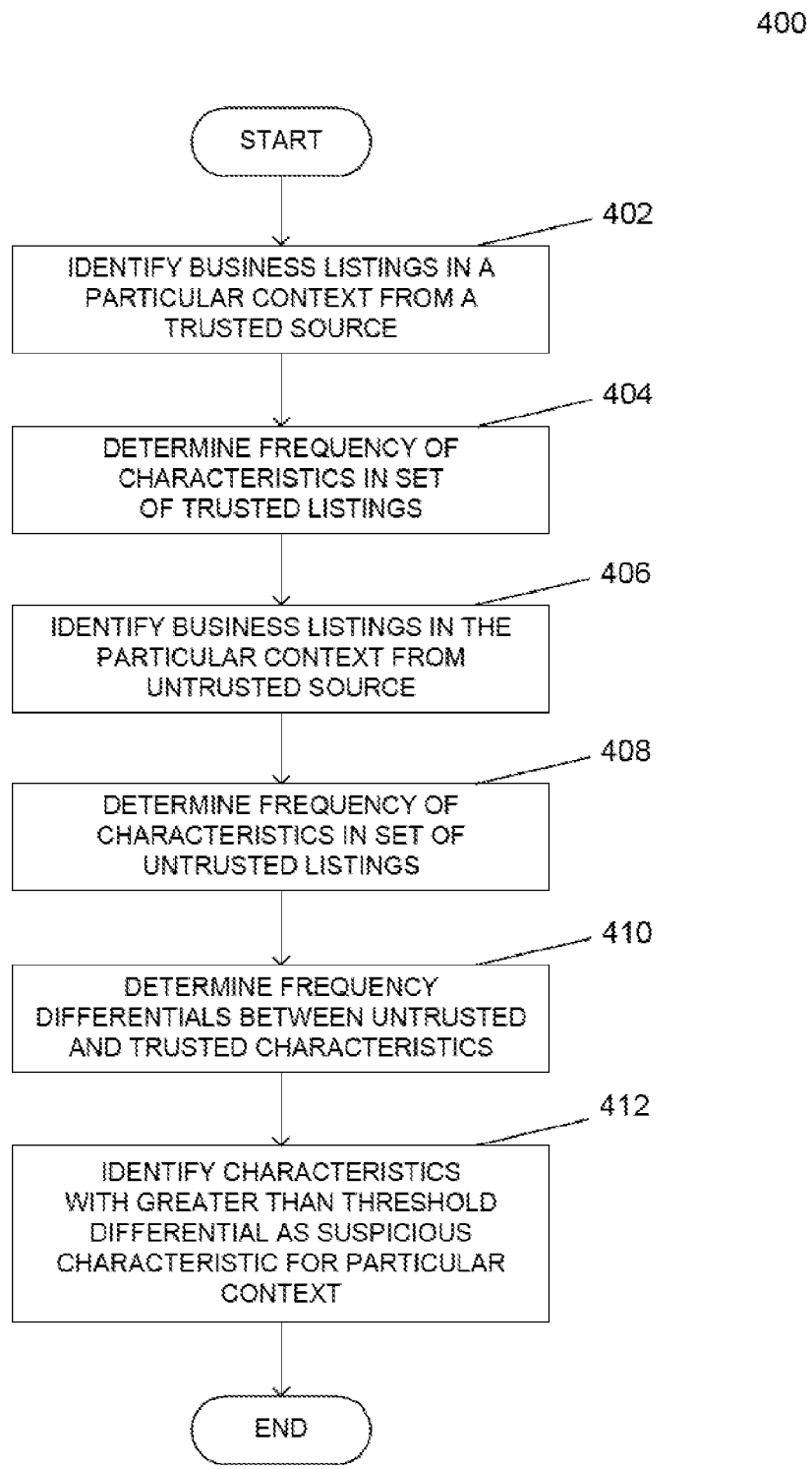
FIG. 4 is a flow diagram depicting an example of a method for identifying suspicious characteristics for a business listing context in accordance with aspects of the disclosure.

FIG. 4 is a flow diagram depicting an example of a method 400 for identifying suspicious characteristics for a business listing context in accordance with aspects of the disclosure. The method 400 identifies characteristics that distinguish business listings from a trusted source that is unlikely to contain spam listings), from an untrusted source that is likely to contain spam listings. Because the primary difference in the two sets of listings is the fact that one set of listings contains spam, characteristics that distinguish the two sets of listings are likely to correlate directly with spam listings.

Once these differential characteristics are determined, they may be used to identify whether a particular listing is a spam listing.

Different listing contexts (e.g., types of businesses) tend to have different "vocabularies," or terms that are frequently used. For example, the terms "flower," "rose," and "bouquet," are more frequently present in the context of florists than for investment banks. As such, narrowing the contextual analysis to a particular business listing context results in a set of differential characteristics that are more likely to account for these different vocabularies, and thus produce a set of differential characteristics that results in a greater likelihood of accurate spam detection. For example, the term "tickets" might not be associated with spam in the context of a travel agent, but might be in the context of attorneys/legal services (e.g., "Law Offices of X, Y, and Z, We'll Fix Your Traffic Tickets!"). The term "bouquet" might be associated with spam in the context of a florist, but not in the context of a wine merchant. The term "AAA" might be associated with spam in the context of a locksmith, but not in the context of an automobile club.

At stage 402, a set of business listings from a trusted source relating to a particular context is identified. A business listing may be identified as belonging to a particular context by the type of business, the location, or other factors. For example, the business listing server 102 may determine a context for a business based upon a type selected by a user. Businesses may also be organized into sub-contexts. For example, a local bank branch and a large investment bank headquarters might both be included in a broad "financial services" context, but in separate sub-contexts, such as "retail banking" and "investment banking", respectively. These sub-contexts may also be analyzed in a similar manner as broader contexts, and the same methods for detection of spam may apply.

At stage 404, the trusted listings in the particular context are analyzed to create a set of trusted characteristics. The set of trusted characteristics includes a listing of the characteristics identified among the trusted listings and the frequency with which each characteristic appears.

At stage 406, a set of business listings received via an untrusted source are identified within the same context as those identified from the trusted source at stage 402. A set of untrusted characteristics are created by analysis of the untrusted listings at stage 408. Similarly to the set of trusted characteristics, the set of untrusted characteristics includes a listing of the characteristics identified among the untrusted listings and a frequency value for each.

At stage 410, frequency differentials for characteristics between the trusted and untrusted characteristics are identified. For example, a particular term may appear 25 times in the trusted characteristics, and 100 times in the set of untrusted characteristics, resulting in a ratio of 4 (e.g., the term is four times as likely to be present in listings from the untrusted source than the trusted source), or the average title length among the trusted characteristics may be 4 words, while the average title length among the untrusted characteristics may be 8 words, resulting in a ratio of 2 (e.g., the title length is twice as long on average in listings from the untrusted source as from the trusted source). The frequency characteristics may be normalized by the number of samples in each set. Using the above example, the characteristic frequency of 25 as identified within the trusted listings may be divided by the number of trusted listings, and the characteristic frequency of 100 as identified within the untrusted listings may be divided by the number of untrusted listings, and the ratio calculated using the normalized values. Aspects of the method may also include other methods of statistical analysis, such as identification of a number of standard deviations for each characteristic, normalization based on the number of analyzed listings in each set of characteristics, normalized based on the number of total listings in the context, and the like.

At stage 412, statistically significant differentials between the frequency values are identified as differential characteristics. A particular characteristic may be identified a differential characteristic in response to a determination that the differential for the characteristic between the two sets is greater than a threshold value, such as the characteristic appearing in the untrusted characteristics at least 20%, 40%, or 60% more often than in the trusted characteristics, or that a characteristic appears in the untrusted characteristics greater than a particular number of standard deviations over the trusted characteristics. The differential characteristics may be used to identify whether a particular listing is likely to be a spam listing (see FIG. 7).

Figure 5:
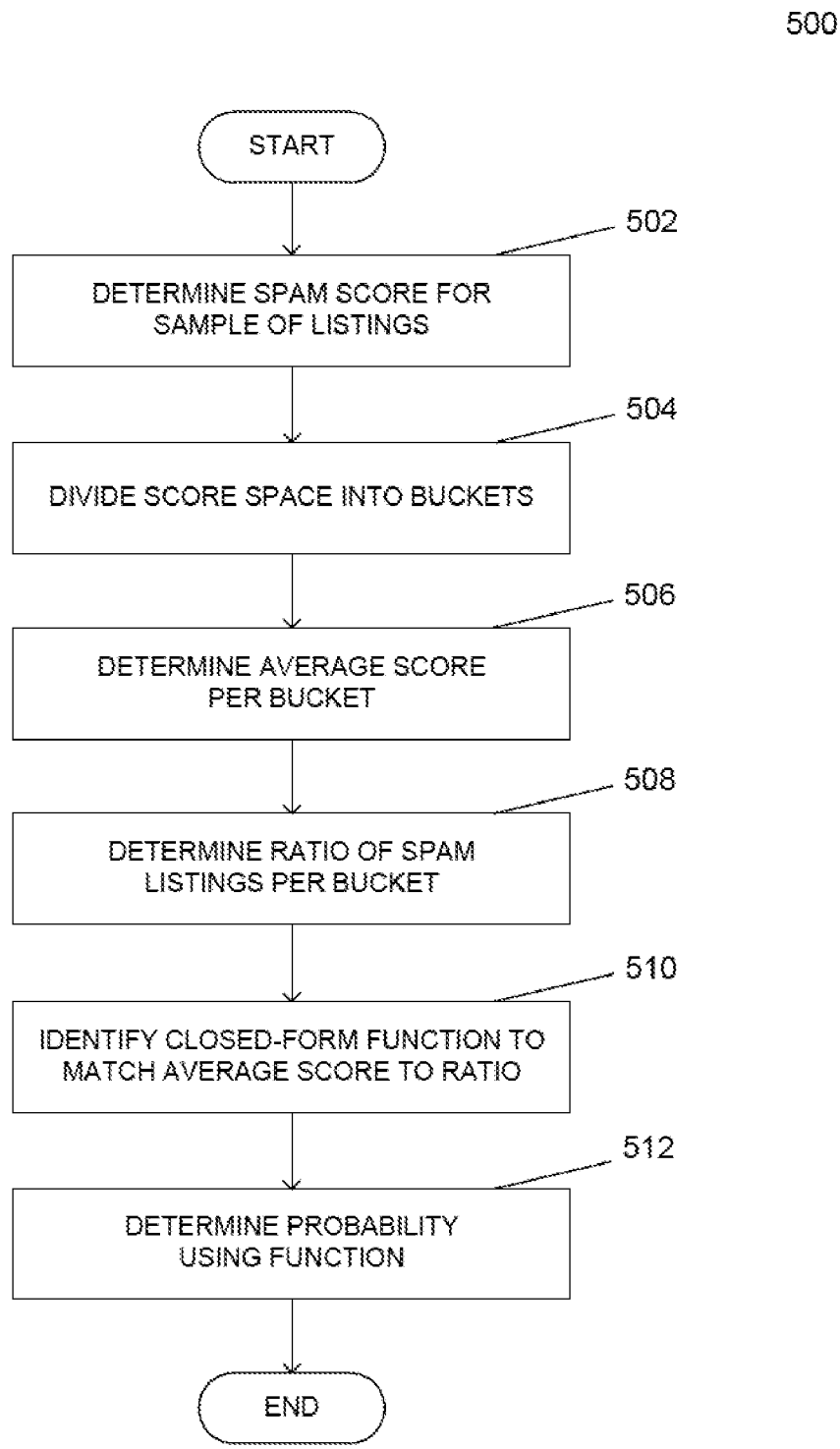
FIG. 5 is a flow diagram depicting an example of a method for determining a probability of spam based upon a calculated spam score in accordance with aspects of the disclosure.

FIG. 5 is a flow diagram depicting an example of a method 500 for determining a probability of spam based upon a calculated spam score in accordance with aspects of the disclosure. Spam detection algorithms may return a "score" for each listing. The higher the score, the more likely that the listing is spam. These algorithms typically generate such a score using a variety of criteria. For example, one method of calculating a spam detection score might be:

$$titlescore*lengthfactor+phonepenalty+specialpenalties$$

The term "titlescore" is a numerical value based on the number of times suspicious terms appear in the listing title, "lengthfactor" is a numerical penalty for based on the length of the title, and "phonepenalty," and "specialpenalties" represent numeric penalties associated with the presence of a particular phone number, and certain special key words, respectively. The use of such a method for calculating a spam score results in a numerical value, where a higher value is associated with an increased likelihood that a listing is spam. However, this number in and of itself does not provide a direct way to identify the probability that a listing is spam. The range depends on the context, and scores from one context are not commensurate with the likelihood of spam from another context. For example, typical stores for a "hotel" context might be in the range of 0 to 130,000, while for a "taxi" context might range from 0 to 49,000. The method 500 thus provides a uniform scoring system to determine a probability for each context.

At stage 502, a score is determined for a sample of listings in a particular context. For example, the above-described score algorithm might be applied to all of the listings associated with a particular context. Each of the sample listings is thus associated with a "raw" score, such as the 0 to 130,000 value described above with respect to the "hotel" context.

At stage 504, the score space (e.g., each listing and its associated score) is divided into a set of "buckets." Each bucket is associated with a range of scores, and each listing is associated with the bucket that applies to its score. For example, if bucket 1 is associated with score range 0 to 10,000, bucket 2 with 10,001 to 20,000, and bucket 3 with 20,001 to 30,000, a listing with a score of 5,000 would be associated with bucket 1.

At stage 506, the average score of each bucket is determined by adding together the score values for the bucket, and dividing by the number of listings associated with the bucket.

At stage 508, the ratio of spam listings to the total number of listings for each bucket is determined. This ratio may be identified by user examination of each listing in the bucket, or by various other spam detection methods.

At stage 510, a closed form function is identified using the average score of each bucket and the ratio of the number of spam listings in the bucket to the total number of listings in the bucket. This function may be identified by performing a curve-fitting operation to identify the function that fits the (average, ratio) data points the best for all of the buckets. Typically, the most appropriate class of function is a sigmoid curve, due to the fact that sigmoid curves are smooth and monotonically strictly increasing (e.g., as the score increases, the value of the function increases). Such curves can also be scaled so that their values are bounded by 0 and 1 (e.g., probability values). In the present example, one possible curve family is defined by the following form suitable for logistic regression:

$$\sigma_{a,b}(x) = \frac{1}{1+e^{-a(x-b)}}. \quad (\text{Eq. 1})$$

To match the curve properly to the data, values for a and b must be chosen, where a and b are values that define the sigmoid curve. One method of determining these values is by the function:

$$f(a, b) = \sum_{(x,y)} (\sigma_{a,b}(x) - y)^2 \quad (\text{Eq. 2})$$

The values (x,y) in Eq. 2 range over the (average, ratio) data points derived from the buckets at stages 506 and 508. A function minimizer may be run to find the values of a and b that give a minimal value to $f(a,b)$. The resulting values of a and b identify a function $\sigma_{a,b}(x)$ that maps a particular spam score to the probability of being a spam listing for the particular context.

At stage 512, the probability that a particular listing is a spam listing in a particular context may be determined by mapping the spam score along the curve identified at stage 510, where the x input value is the spam score and the y output value is the probability that the listing is spam for the particular context.

Figure 6:
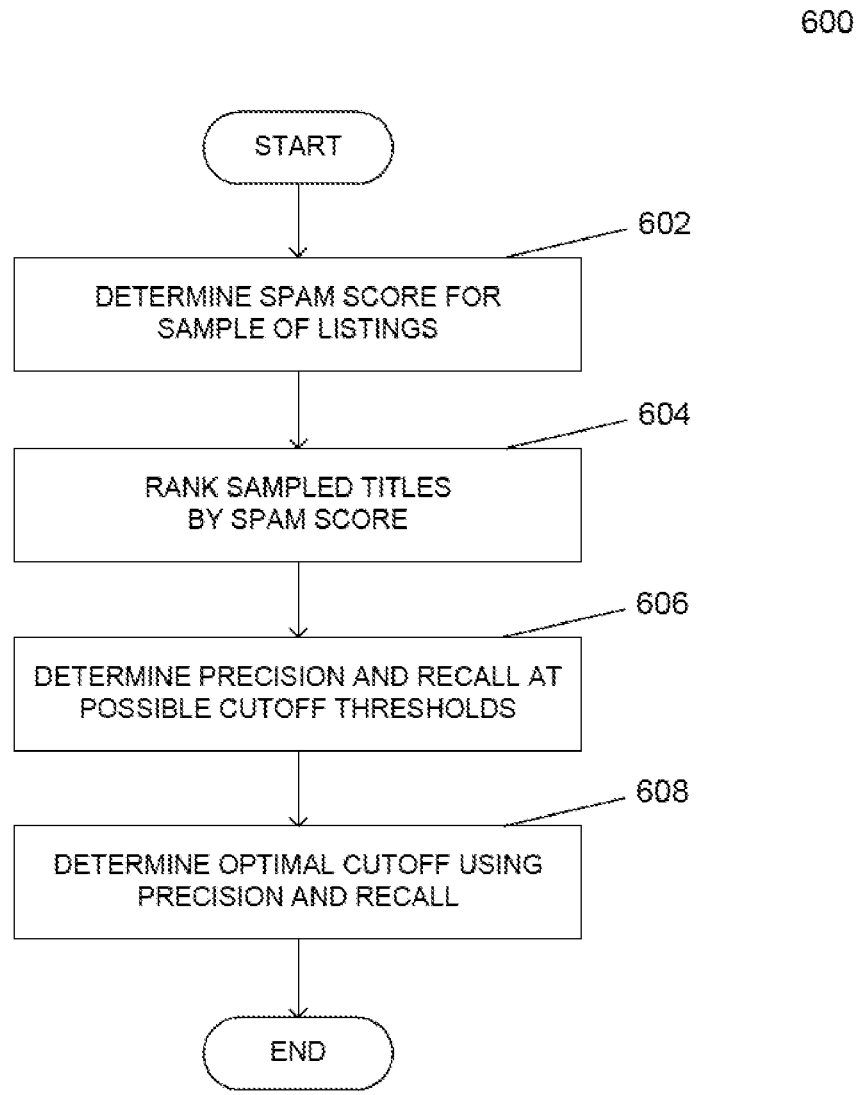
FIG. 6 is a flow diagram depicting an example of a method for determining a probability threshold for identification of spam in accordance with aspects of the disclosure.

FIG. 6 is a flow diagram depicting an example of a method 600 for determining a probability threshold for identification of spam in accordance with aspects of the disclosure. In addition to requiring different score calibration (see FIG. 5), different contexts may also require different cutoff thresholds for identifying a listing as spam. For example, for a particular context, any listing with a computed spam probability greater than 0.85 turns out to be a spam listing. In such a case, specifying a cutoff value of 0.99 would miss many spam listings. However, lowering the cutoff too far increases the risk of false positives. Since different contexts have different likelihoods of false positives, it is appropriate to identify a specific cutoff for each context.

As with the method 500 described above (see FIG. 5), the method 600 begins with a determination of spam scores for a sample of listings in the particular context at stage 602. At stage 604, the listings are ranked in order of their associated spam score. Different cutoff thresholds are identified between the listings. For example, a cutoff threshold may be identified as the midpoint between each adjacent listing, such that two adjacent listings with spam scores of 50 and 100, respectively, would create a potential cutoff threshold of 75.

At stage 606, the precision and recall of each possible cutoff threshold is identified. Precision refers to the fraction of higher-scoring titles that are truly spam (e.g., not false positives), and recall is the fraction of truly-spam titles that have scores greater than the cutoff. In this manner, each possible cutoff value is evaluated based on the potential for false positives. One method of calculating the validity of each cutoff value is represented by the following function:

$$F(\text{cutoff}) = \frac{\text{precision} \times \text{recall}}{\text{precision} + \text{recall}}. \quad (\text{Eq. 3})$$

At stage 608, the optimal cutoff is determined. Maximizing the value of F( ), by picking the cutoff with the greatest value of F from among the choices, gives an estimate of the best cutoff. In some aspects, the cutoff may be determined from a set of {cutoff from maximizing F, cutoff giving a probability of spam greater than about 0.9, cutoff giving precision greater than about 0.95}, by choosing the greatest of the three values. The latter two values (probability greater than about 0.9, precision greater than about 0.95) provide "safety conditions" to ensure that a cutoff value with a high number of false positives is not chosen due to a low maximum value of F due to a large recall value.

Figure 7:
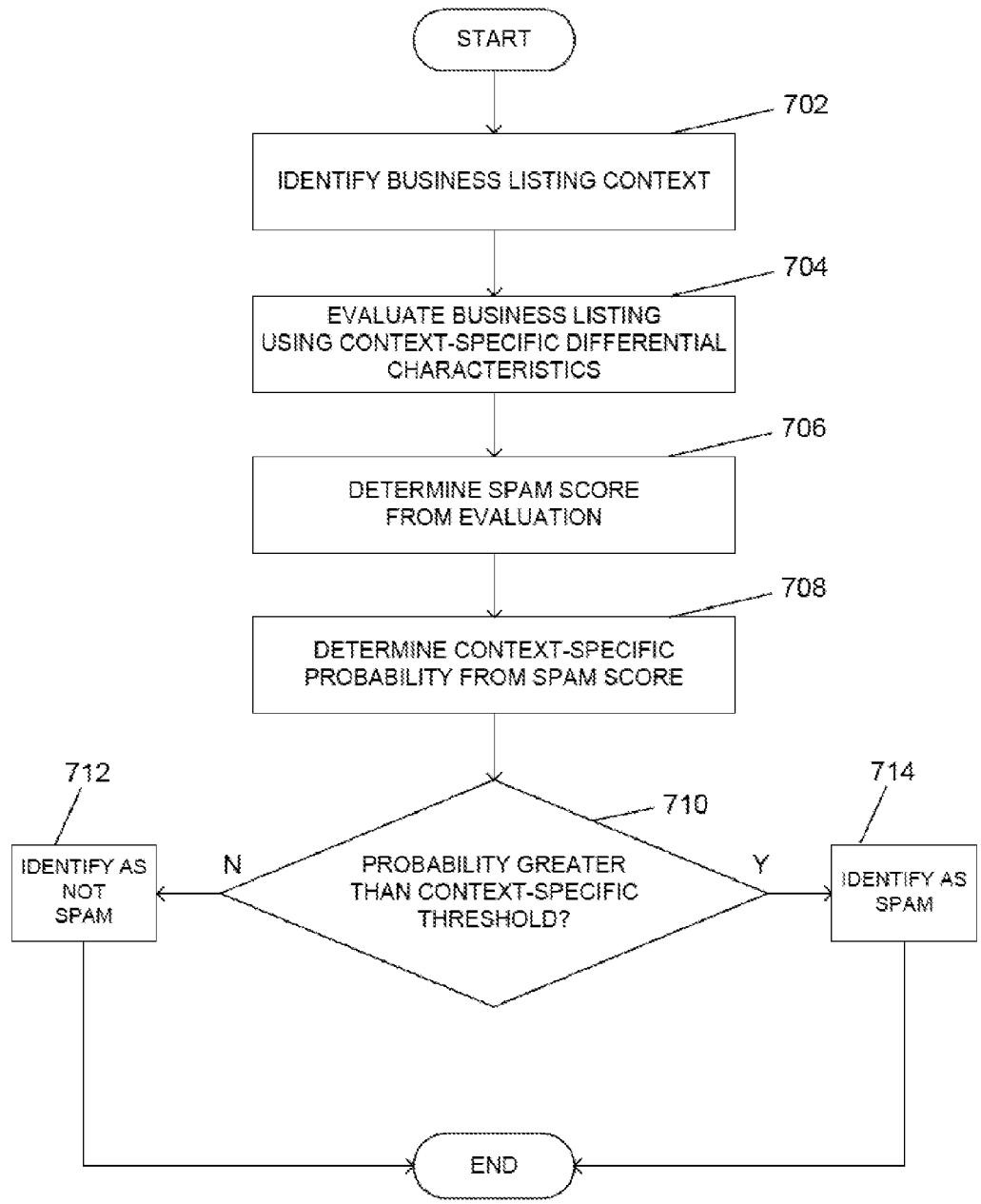
FIG. 7 is a flow diagram depicting an example of a method for identifying whether a business listing is spam in accordance with aspects of the disclosure.

FIG. 7 is a flow diagram depicting an example of a method 700 for identifying whether a business listing is spam in accordance with aspects of the disclosure. The method 700 utilizes the differential characteristics (see FIG. 4), the probability for the particular context based on a spam score (see FIG. 5), and a context-specific threshold derived for the particular context (see FIG. 6), to determine whether a particular listing should be identified as a spam listing. The method 700 may be applied to listings as they are newly received from the data sources, or listings already stored on the business listing server may periodically be evaluated.

At stage 702, a context is identified for a business listing that is to be evaluated for spam. As described above, the context may be identified by a particular type of business as specified in the listing, or it may be determined by the business listing server based on other characteristics of the business listing. The context of the business determines the differential characteristics, the probability conversion, and the context-specific threshold that are used to evaluate the business listing as spam or not.

At stage 704, the business listing is evaluated using context-specific differential characteristics. As described above (see FIG. 4), certain characteristics within a particular context tend to indicate that a listing is a spam listing. These characteristics may be previously defined in an "off-line" processing manner, such that the evaluation of the business listing may be conducted in an efficient manner.

Depending upon the characteristics of the business listing, a spam score for the listing is assigned at stage 706. The spam score reflects the presence or absence of various differential characteristics within the business listing.

At stage 708, the probability that the listing is spam is determined by using a function to identify the position of the spam score on a context-specific curve (see FIG. 5). The function maps the spam score to a particular probability value associated with the context in which the business listing is evaluated.

At stage 710, the probability is compared to a context-specific threshold. The context-specific threshold represents a cutoff value above which it is highly likely that the given business listing is a spam listing. This threshold is derived from a precision value and a recall value for various possible cutoff values (see FIG. 6).

If the probability that the listing is spam is greater than the threshold, the listing is reported as spam at stage 714. Otherwise, the listing is identified as not spam at stage 712. The method 700 ends after determining whether the listing is spam, though it may be repeated or performed in parallel on multiple listings, all listings in a particular context, or a subset of all listings in a particular context.

The stages of the illustrated methods described above are not intended to be limiting. The functionality of the methods may exist in a fewer or greater number of stages than what is shown and, even with the depicted methods, the particular order of events may be different from what is shown in the figures and include additional stages or omit stages as shown.

Aspects of the disclosure advantageously provide for an efficient way to identify business listing characteristics that are indicative of spam, and then use those characteristics to detect spam listings. By limiting characteristic vocabularies to a particular context, detection accuracy is greatly approved. Performing differential characteristic identification in an off-line manner advantageously improves the efficiency of spam detection operations, and context-specific identification of listing spam probability and identification cutoff thresholds improves detection accuracy and eliminates potential false positive reports.

Although aspects of the disclosure herein have been described with reference to particular aspects, it is to be understood that these aspects are merely illustrative of the principles and applications of the present disclosure. It is therefore to be understood that numerous modifications may be made to the illustrative aspects and that other arrangements may be devised without departing from the spirit and scope of the disclosure as defined by the appended claims. Furthermore, while certain operations and functions are shown in a specific order, they may be performed in a different order unless it is expressly stated otherwise.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer implemented method for identifying business listings, the method comprising:
   determining, using one or more processors, a first frequency value of a business listing characteristic within a first plurality of business listings received from a first source, the first plurality of business listings being associated with a particular business listing context;
   determining, using the one or more processors, a second frequency value of the business listing characteristic within a second plurality of business listings received from a second source, the second plurality of business listings being associated with the particular business listing context;
   determining, using the one or more processors, a frequency differential between the first frequency value and the second frequency value;
   in response to the frequency differential exceeding a threshold differential, identifying, using the one or more processors, the business listing characteristic as a differential characteristic; and
   identifying, using the one or more processors, a particular business listing of the plurality of business listings as a spam listing using the differential characteristic.

2. The method of claim 1, wherein the business listing context is a type of business.

3. The method of claim 1, wherein the threshold differential is a standard deviation value.

4. The method of claim 1, wherein the business listing characteristic is at least one of a title length, a text term, a phone number, and an address.

5. The method of claim 1, wherein identifying the particular business listing further comprises:
   identifying, using the one or more processors, a spam score for the particular business listing using the differential characteristic; and
   wherein identifying the past business listing as the spam listing is done in response to the spam score being greater than a threshold.

6. The method of claim 5, wherein identifying the particular business listing further comprises:
   mapping, using the one or more processors, the spam score to a context-specific curve associated with the business listing context to determine a probability that the particular business listing is spam; and
   wherein identifying the past business listing as the spam listing is done in response to the probability being greater than a probability threshold.

7. The method of claim 6, wherein the probability threshold is a context-specific probability threshold associated with the business listing context.

8. The method of claim 1, wherein the first source is a trusted source and the second source is an untrusted data source.

9. A processing system for identifying business listings, the processing system comprising:
   one or more computing devices, each of the one or more computing devices having one or more processors; and
   a memory, coupled to the one or more processors, for storing business listings;
   wherein the one or more computing devices is configured to:
   determine a first frequency value of a business listing characteristic within a first plurality of business listings received from a first source, the first plurality of business listings being associated with a particular business listing context;
   determine a second frequency value of the business listing characteristic within a second plurality of business listings received from a second source, the second plurality of business listings being associated with the particular business listing context;
   determine a frequency differential between the first frequency value and the second frequency value;
   in response to the frequency differential exceeding a threshold differential, identify the business listing characteristic as a differential characteristic; and
   identify a particular business listing of the plurality of business listings as a spam listing using the differential characteristic.

10. The processing system of claim 9, wherein the business listing context is a type of business.

11. The processing system of claim 9, wherein the threshold differential is a standard deviation value.

12. The processing system of claim 9, wherein the business listing characteristic is at least one of a title length, a text term, a phone number, and an address.

13. The processing system of claim 9, wherein the one or more processors is further configured to:
  identify a spam score for the particular business listing using the differential characteristic; and
  identify the particular business listing as the spam listing in response to the spam score being greater than a threshold.

14. The processing system of claim 13, wherein the one or more processors is further configured to:
  map the spam score to a context-specific curve associated with the business listing context to determine a probability that the particular business listing is spam; and
  identify the business listing as a spam listing in response to the probability being greater than a probability threshold.

15. The processing system of claim 14, wherein the probability threshold is a context-specific probability threshold associated with the business listing context.

16. The processing system of claim 9, wherein the first source is a trusted source and the second source is an untrusted data source.

17. A non-transitory, computer-readable medium on which instructions are stored, the instructions, when executed by one or more computing devices performs a method, the method comprising:
  determining a first frequency value of a business listing characteristic within a first plurality of business listings received from a first source, the first plurality of business listings being associated with a particular business listing context;
  determining a second frequency value of the business listing characteristic within a second plurality of business listings received from a second source, the second plurality of business listings being associated with the particular business listing context;
  determining a frequency differential between the first frequency value and the second frequency value;
  in response to the frequency differential exceeding a threshold differential, identifying the business listing characteristic as a differential characteristic; and
  identifying a particular business listing of the plurality of business listings as a spam listing using the differential characteristic.

18. The non-transitory, computer-readable medium of claim 17, wherein the business listing context is a type of business.

19. The non-transitory, computer-readable medium of claim 17, wherein the threshold differential is a standard deviation value.

20. The non-transitory, computer-readable medium of claim 17, wherein the business listing characteristic is at least one of a title length, a text term, a phone number, and an address.

* * * * *